Oct. 27, 1970 J. J. HATFIELD 3,537,096
INTEGRATED TIME SHARED INSTRUMENTATION DISPLAY
Filed Oct. 17, 1967 3 Sheets-Sheet 1

INVENTOR.
JACK J. HATFIELD
BY
ATTORNEYS

Oct. 27, 1970    J. J. HATFIELD    3,537,096
INTEGRATED TIME SHARED INSTRUMENTATION DISPLAY
Filed Oct. 17, 1967    3 Sheets-Sheet 2

INVENTOR.
JACK J. HATFIELD
BY
ATTORNEYS

United States Patent Office 3,537,096
Patented Oct. 27, 1970

3,537,096
INTEGRATED TIME SHARED INSTRUMENTATION DISPLAY
Jack J. Hatfield, Hampton, Va., assignor to the United States of American as represented by the Administrator of the National Aeronautics and Space Administration
Filed Oct. 17, 1967, Ser. No. 676,386
Int. Cl. H04n 1/18
U.S. Cl. 340—324      15 Claims

ABSTRACT OF THE DISCLOSURE

This invention is a method and apparatus for displaying instrumentation in an integrated, time-sharing manner. The method utilizes the principle that composite displays may be formed by mixing static and dynamic elements. The method comprises a technique for synthetically generating said elements through the selection and animation of fixed patterns from photographic transparency storage. The method comprises the steps of: (1) preparing fixed static pattern transparencies and fixed dynamic pattern transparencies from instrumentation mockup art work; (2) storing of said photographic transparencies within the apparatus; (3) selecting of desired fixed static pattern and fixed dynamic patterns by the apparatus; (4) animating selected dynamic patterns by the apparatus; (5) displaying of said animated dynamic patterns conjunctively with said static patterns; and (6) controlling said displays in an integrated, time-sharing manner so that a plurality of sequentially occurring conjunctive displays is provided. The apparatus comprises a static pattern store, a dynamic pattern store, a pattern animator, a static display device, a dynamic display device, and a composite display device. A control means controls the selection of stored, static patterns for display on the static display device. The control means also controls the selection and animation of stored dynamic patterns, through the pattern animator, for display on the dynamic display device. The combining of patterns from the static display device and the dynamic display device is automatic. The composite display device, therefore, displays an integrated or composite display. In addition, the control means, through its control of the selection of static and dynamic patterns and through the animation of said dynamic patterns, controls a plurality of composite displays so that plurality of composites can be displayed on the composite display device in a sequential time-sharing manner.

---

The invention described herein was made by an employee of the United States Government and may be manufactured and used by or for the governmental purposes without the payment of any royalties thereon or therefor.

BACKGROUND OF THE INVENTION

One of the major problems in the manual control of aerospace vehicles is the display of vast quantities of information about spacecraft attitude. In addition, large amounts of information about the environment inside and outside of the spacecraft must be displayed. Further, information about the spacecraft's controls must be displayed. In complex, multiphased missions, an astronaut must consume great quantities of control information about rapidly occurring events. In light of this information, he must control his space vehicle in a very exacting manner. With conventional instrument arrays, the pilot must scan a plurality of instruments to determine this control information. And, scanning increases the possibility of misreading instruments as well as limits concentration and increases fatigue. Hence, it is desirable to provide an integrated, time-sharing display so that information can be sequentially displayed on a single general purpose display device.

Therefore, it is an object of this invention to provide an integrated, time-sharing method of displaying information.

It is another object of this invention to provide an integrated time-sharing display system.

It is also an object of this invention to provide an integrated time-sharing method of displaying large quantities of information.

It is another object of this invention to provide an integrated time-sharing display means for displaying large quantities of information.

It is yet another object of this invention to provide an integrated time-sharing method of displaying large quantities of control information on a single general purpose display means for use by a pilot of a spacecraft.

It is a further object of this invention to provide an integrated time-sharing display means for displaying large quantities of control information on a single general purpose display means for use by the pilot of a spacecraft.

Additionally, a major problem in the manual control of aerospace vehicles is the implementation of instrumentation displays for simulator research. Present implementation methods are encumbered by the long time lags and high cost of physical instrument development. Further encumberance is rendered by the inflexibility of single-purpose instrumentation. An additional disadvantage is that physical instruments chosen or developed frequently must be discarded subsequently because of poor pilot performance, pilot opinion, or vehicle design changes. Hence, it is desirable to provide for a more effective, less costly, and less time consuming means of creating dynamic instrument replicas for simulator evaluation. Such a means would be provided by a rapidly programable, universal display which synthesizes desired instrumentation at the control-display interface.

Therefore, it is a further object of this invention to provide a rapidly programable method of displaying synthetic instrumentation.

It is another object of this invention to provide a rapidly programable display system for displaying synthetic instrumentation.

It is also an object of this invention to provide a universal method of displaying synthetic instrumentation; i.e., capable of the synthesis of a wide spectrum of displays including symbolic and/or pictorial formats.

It is another object of this invention to provide a universal display system for displaying synthetic instrumentation; i.e., capable of the synthesis of a wide spectrum of displays including symbolic and/or pictorial formats.

It is yet another object of this invention to provide a rapidly programable, universal method of displaying synthetic instrumentation for the use and/or evaluation of the pilot of a simulator.

It is a further object of this invention to provide a rapidly programable, universal display system for displaying synthetic instrumentation for the use and/or evaluation of the pilot of a simulator.

SUMMARY OF THE INVENTION

In accordance with a principle of this invention, a method for displaying information is provided. The method comprises the steps of: (1) preparing fixed static pattern transparencies and fixed dynamic pattern transparencies from instrumentation mockup art work; (2) storing of said photographic transparencies within the apparatus; (3) selecting of desired fixed static pattern and fixed dynamic patterns by the apparatus; (4) animating selected dynamic patterns by the apparatus (5) displaying of said animated dynamic patterns conjunctively with said static patterns; and (6) controlling said displays in an integrated time-sharing manner so that a plurality of conjunctive sequentially occurring displays are provided.

In accordance with a further principle of this invention, said static pattern is the static or background portion of an instrumentation display and said dynamic patterns are the dynamic portions of an instrumentation display.

In accordance with another principle of this invention, said stored, fixed dynamic patterns are electronically animated to convey movement in said integrated, time-sharing instrumentation display.

In accordance with a further principle of this invention, an apparatus for carrying out the method is provided. The apparatus comprises a static pattern store, a dynamic pattern store, a pattern animator, a static display device, a dynamic display device, and a composite display device. A control means controls the selection of stored static patterns for display on the static display device. The control means also controls the selection and animation of stored dynamic patterns, through the pattern animator, for display on the dynamic display device. The combining of patterns from the static display device and the dynamic display device is automatic. The composite display device, therefore, displays an integrated or composite display.

In accordance with another principle of this invention, said static patterns and dynamic patterns can be stored in plurality to provide for the synthetic generation of a plurality of composite displays in a sequential, integrated, time-sharing manner.

In accordance with another principle of this invention, the control means controls said static and dynamic displays in an integrated, time-sharing manner so that a plurality of sequentially occurring composite displays can be displayed.

It will be appreciated by those skilled in the art and others that the invention provides an uncomplicated system for displaying large amounts of information, such as the readings of instruments, in an integrated, time-sharing manner. It will also be appreciated by those skilled in the art and others that the invention provides a programmable display system in which dynamic instrumentation configurations can be synthesized rapidly and changed at a low cost. Further, it will be appreciated by those skilled in the art and others that the invention provides a universal display device having the capability of synthetically generating many types of symbolic, pictorial, and conventional (scale-pointer) instrumentation displays from photographed art work. In general, all the invention requires is a static pattern store, a dynamic pattern store, a pattern animator, and a combination display. The static portion of the combination display may be the background or scale display of an instrument or instruments while the dynamic or animated portion of the combination display may be the reading of the instrument or instruments.

It will also be appreciated by those skilled in the art and others, that the invention eliminates many development instrumentation problems such as, for example: the selection and/or design of many types of electromechanical instruments; the modification of meter faces or tapes; the construction and/or modification of servo-driven gear trains; the construction of specialized meter driven circuitry; and the modification of instrument display means when a single display is utilized for a plurality of instruments.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
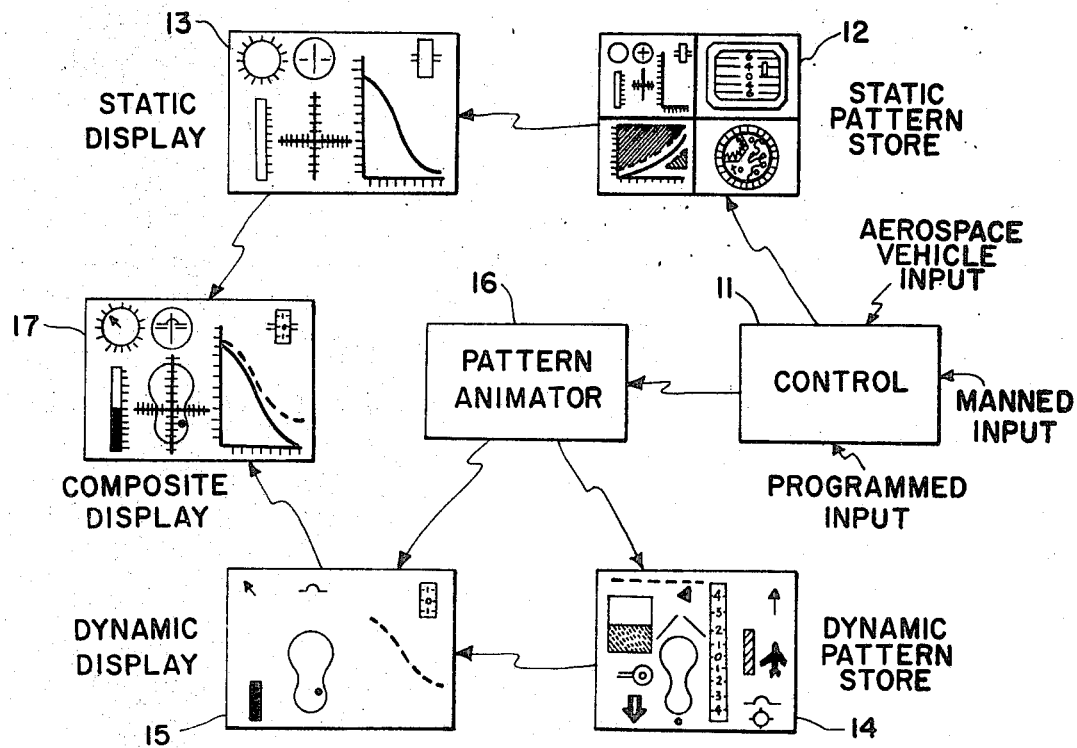
FIG. 1 is a functional block diagram illustrating the method of the invention.

FIG. 1 is a functional block diagram illustrating the method of the invention and comprises: a control 11; a static pattern store 12; a static display 13; a dynamic pattern store 14; a dynamic display 15; a pattern animator 16; and a composite display 17. The control 11 has three inputs; an aero space vehicle input; a manned input; and a program input.

The aerospace vehicle input feeds data on the status of the aero space vehicle into the control. This data may relate to the attitude of the craft or, it may relate to internal or external environment conditions. In addition, the data may relate to various reference points such as stars or the sun. Moreover the data may relate to spacecraft conditions such as the amount of fuel on board or the level of charge in the batteries.

The manned input is the input from the pilot of the vehicle as created by his movement of the vehicle's controls. And, the program input is an input from a preprogrammed means such as a digital tape or memory bank.

The static pattern store 12 is used in the system to store a plurality of photographic transparencies containing the data backgrounds or scales of the various instrument readings to be displayed in sequential plurality on the composite display 17. The desired background or static pattern photographic transparency is selected from the static pattern store 12 by the control 11 for display on the static display 13. That is, for any information, such as an instrument reading, to have meaning it is necessary that the reading be compared with a reference. The static display 13 provides this reference.

By way of example, the block representing the static pattern store 12 is shown to contain four (4) static pattern photographic transparencies. The photographic transparency stored in the upper left hand corner of this block is the one shown selected for display on the static display 13. In the upper left corner of the block representing the static display 13 is the scale of a conventional meter, in the lower left corner is a linear scale and in the lower center is a Cartesian coordinate axis. Above the Cartesian coordinate axis is a specialized circular scale that, for example, could be a false horizon scale of the type that is well known in the aircraft industry. On the right side of the static display block 13 is a contour type of display which can be used, as hereinafter described, to compare a desired contour with an actual contour. That is, the background contour display could be a desired contour and the dynamic display as hereinafter described could be the actual contour. Above the contour display is a vertical tape window with lubber lines which can be used, as hereinafter described, to obtain a reading from a vertically moving tape scale. That is, the background window display could provide the static reference and the dynamic display as hereinafter described could provide vertical scale motion, i.e., reading.

The dynamic pattern store 14 is used in the system to store a plurality of dynamic elements or patterns on a single photographic transparency or on a film transport. This store 14 contains those dynamic patterns necessary to convey the actual reading or indication for each of the items contained in a single static or background display and for a plurality of said displays being conjunctively displayed on the static display 13 and on the composite display 17 as described previously herein.

Each dynamic element stored in the dynamic pattern store 14, which is desired for a specific composite, must be selected and positioned on the dynamic display 15 to a nominal position in the display so as to superimpose with the correct static data on the composite display 17 and so as to provide an unperturbed indication in the absence of an animation control signal as hereinafter described. The dynamic patterns stored in the dynamic pattern store 14, also, being fixed and static in nature as stored on photographic film, require some means of attaining motion appropriate to relate instrumentation readings on the composite display 17. This motion is attained electronically by the control 11 through the pattern animator 16. Thus, it can be seen that dynamic pattern selection, dynamic pattern location for display, and dynamic pattern animation for display is achieved by the control 11 through the pattern animator 16 in conjunction with the dynamic pattern store 14 and the dynamic display 15.

The dynamic display 15 displays the actual reading for each of the items contained in the static or background display and the composite display 17. For example, in the upper left corner of the dynamic display block 15 is an arrow which when used with the conventional meter scale of the static display provides an instrument reading. This composite is illustrated in the upper left corner of the composite display 17. Similarly, the linear scale reading illustrated in the lower left corner of the dynamic display when combined with the linear scale of the static display 13 provides an understandable linear scale reading of the type illustrated in the lower left corner of the composite display 17.

An irregular display containing a dot is illustrated in the lower center portion of the dynamic display 15. When this irregular display is combined with the Cartesian coordinate axis of static display 13, the composite display illustrated in the lower center of the composite display 17 is provided. And, the short horizontal line illustrated in the upper portion of the dynamic display 15 when combined with the specialized meter display of the static display 13 provides the composite display illustrated in the upper center portion of the composite display 17. The dotted contour line display of the dynamic display 15 combines with the contour display of the static display 13 to provide the overall display in the right portion of the composite display 17. And, the moving tape or scale display of the dynamic display 15 combines with the lubber line window display of the static display 13 to provide the overall display in the right upper portion of the composite display 17.

It will be appreciated from the foregoing description, that the invention is an "electronic animation" technique for displaying instrument readings or other similar types of data. A static or background display which may be the scale of the instrument is combined with a dynamic display which may be the scale reading. And, the combined display is displayed on a composite display means. The composite display means can be a cathode ray tube, for example.

Figure 2:
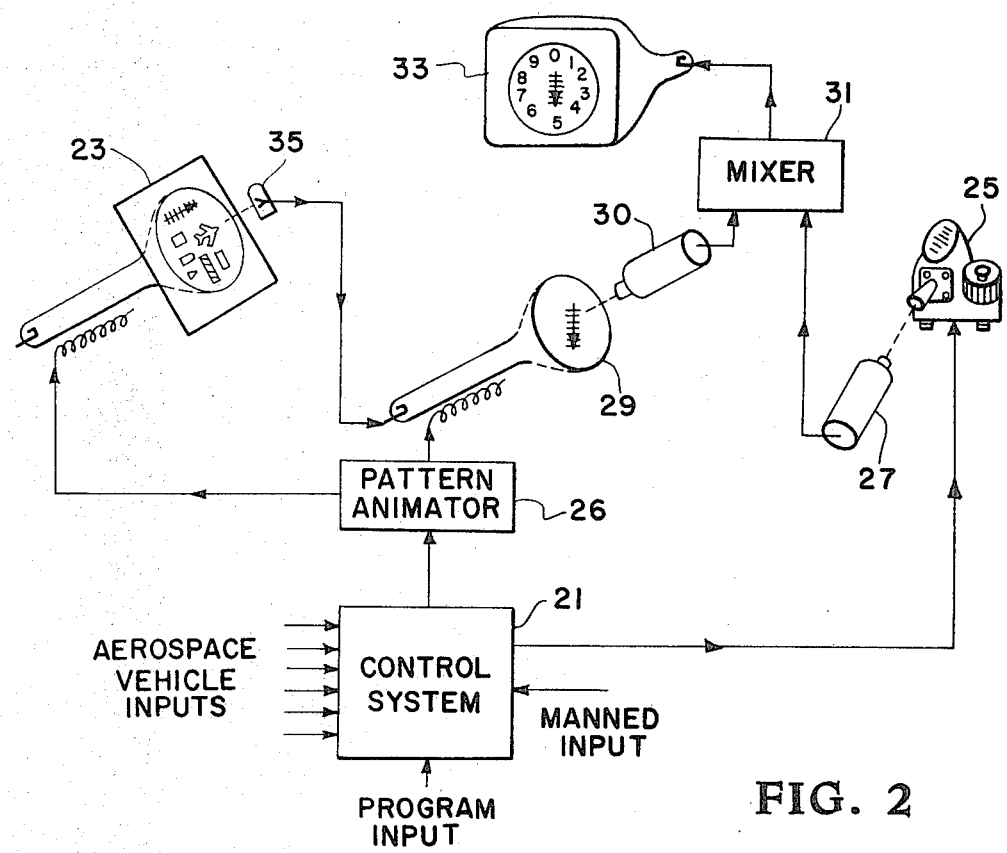
FIG. 2 is a partially block and partially perspective diagram illustrating one embodiment of the invention.

FIG. 2 illustrates a preferred embodiment of the apparatus of the invention that comprises: a control system 21; a dynamic pattern store 23; a static pattern store 25; a pattern animator 26; a vidicon camera 27; a dynamic display 29; a second vidicon camera 30; a mixer 31; a composite display 33; and a photomultiplier-amplifier 35. The static and dynamic stores store appropriate static and dynamic displays of the type illustrated in the static and dynamic display blocks of FIG. 1. As perspectively illustrated in FIG. 2, the dynamic pattern store is preferably a flying spot film scanner tube and the static pattern store is a slide projector.

The control system 21 has a manned input, a program input, and a spacecraft input. One output of the control system 21 is connected to the pattern animator 26, a second output of the control system is connected to the static pattern store 25. One output of the pattern animator is connected to the dynamic display 29. The photomultiplier-amplifier 35 is mounted so that light from the surface of the flying spot scanner tube of the dynamic pattern store 23 is modulated by the density of the film stored dynamic element being scanned before impinging on its photosensitive surface. The output of the photomultiplier-amplifier is connected to the input of the dynamic display 29, which as the perspective drawing shows, is preferably a cathode ray tube display.

The first vidicon camera 27 is mounted so as to scan the pattern displayed on the static pattern store's display surface. The second vidicon camera 30 is mounted so as to scan the animated dynamic patterns displayed on the dynamic display 29. The outputs from these vidicon cameras 27 and 30 are separately connected to inputs of the mixer 31. The output from the mixer is connected to the composite display 33.

As stated above, the dynamic pattern store 23 is preferably a random access flying spot film scanner. More specifically, the dynamic pattern store is a device having a plurality of dynamic elements or patterns in its transparency film plane. These elements can be selectively scanned and animated in accordance with the electronic controls applied to the device. The control function is performed by the pattern animator 26 in conjunction with the control system 21.

As also stated above, the static pattern store 25 is preferably a random access slide projector. The control system 21 determines what slide is being displayed at any particular time.

As described with respect to FIG. 1, the static pattern store 25 displays the background pattern, such as an instrument scale, while the pattern for the instruments indicator is selected from dynamic pattern store 23 and is animated by the pattern animator 26 before display on the dynamic display 29. This indicator or dynamic pattern is mixed in the mixer 31 with the static display so that a composite overall instrument reading is displayed on the composite display 33.

Because the dynamic display patterns are mechanically stationary in the dynamic pattern store 23, it is necessary to electronically manipulate them in some manner so that the correct instrument readings are shown. More specifically, it may be that a single dynamic pattern is to be used with two or more static patterns and thus, must be displayed in an animated manner two or more times. Further, as instrument readings change, the location, aspect, structure, and/or magnification of each dynamic element in the dynamic display 29 must change. For example, the arrow illustrated in the upper left corner of the dynamic block 15 of FIG. 1 must move to various radial positions; also, the linear indicator illustrated in the lower left corner must lengthen and shorten. These changes in position and size are performed by the pattern animator 26 in conjunction with the dynamic pattern store 23 and the dynamic display 29. That is, an animation of the dynamic patterns occur so that compatible actual instrument readings are displayed when the dynamic patterns are combined with the static patterns.

The mixer 31 mixes the static pattern signals from the first vidicon with the dynamic pattern signals from the second vidicon. Hence, the output from the mixer is a combined signal. The combined signal is displayed on the composite display which, preferably, is a TV or cathode ray tube display.

It will be appreciated by those skilled in the art and others that the overall system is rather uncomplicated. The apparatus of the invention merely combines a static background pattern such as an instrument scale with a dynamic pattern such as an instrument indicator. While both the static and dynamic patterns are initially stationary, the dynamic pattern, as illustrated in FIG. 2, is electronically manipulated by a pattern animator to provide an actual variable instrument reading on a composite display.

The control system 21, controls which instrument display of a plurality of possible instrument displays is actually displayed. In addition, the control system determines the sequence of displays, the time of each display and any other functions of the display. More specifically, the program input to the control system 21 sets up the control system 21 so that it will control the composite display in accordance with a predetermined program.

The control system 21 controls the pattern animator 26 and the static pattern store. That is, after the choice has been made about what intrument reading is to be displayed, the control system selects the appropriate background pattern. It also controls the random access flying spot film scanner (dynamic pattern), through the pattern animator, so that the appropriate dynamic pattern is scanned. Further, the control system 21 controls the pattern animator 26 so that the dynamic pattern is suitably manipulated as hereinabove described. In addition to controlling the selection of patterns and animation by the pattern animator 26, the control system also controls the timing of all subsystems so that when the signals are mixed by the mixer, a uniform composite display is created.

The dynamic display 29 and the second vidicon camera 30 of FIG. 2 comprise a non-storage scan converter in which dynamic elements are positioned into the correct geometrical array and are animated by the dynamic display utilizing individual scanning rasters. The animated patterns are converted into a television format by the single scanning raster of the second vidicon camera 30 for simple video mixing of static and dynamic display elements by the mixer 31. The advantages of this embodiment over embodiments hereinafter described is provided by the above described non-storage scan conversion technique. These advantages are: flicker free dynamic element generation and capability for remote distribution of the composite display 33.

Figure 3:
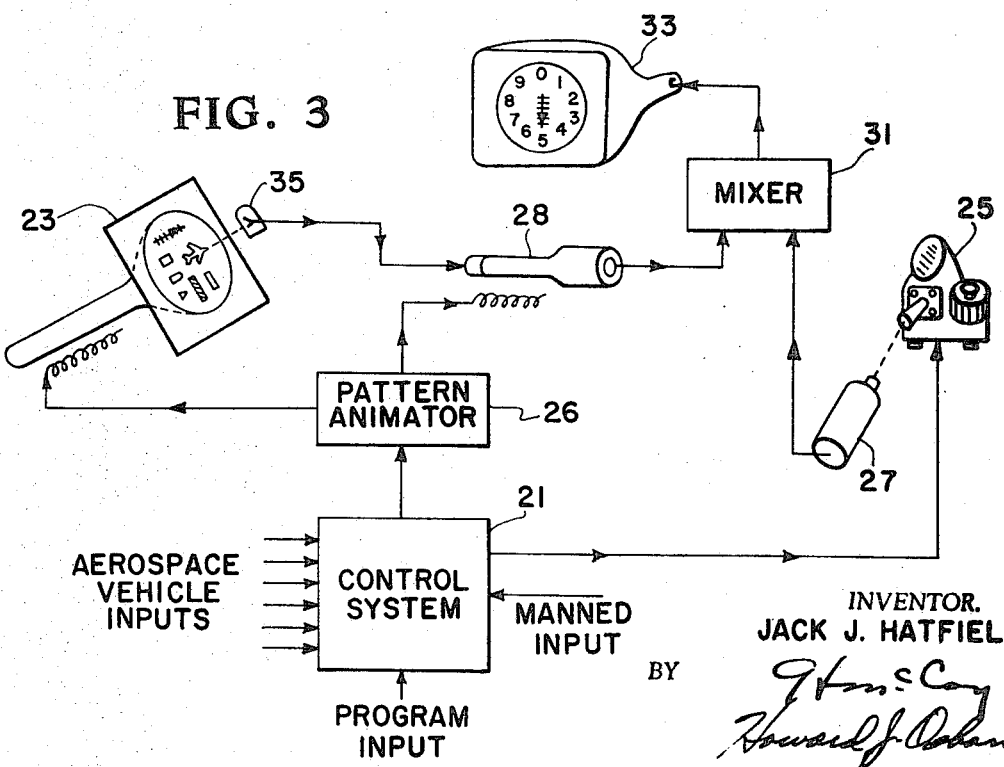
FIG. 3 is a partially block and partially perspective diagram illustrating a second embodiment of the invention.

FIG. 3 illustrates an alternate embodiment of the invention that comprises all the elements of FIG. 2 with the exception that the dynamic display 29 and the second vidicon camera 30 are replaced by a recording storage tube scan converter 28. The method of attaining the correct geometrical array of animated dynamic patterns with the scan converter of FIG. 3 is identical with the method of FIG. 2, with the exception that in the recording storage tube of FIG. 3, the animated patterns are not displayed, but rather stored in the form of charge patterns on two dimensional stored dielectric coated storage screen. The stored charge patterns are converted into television video signals by utilizing a single scanning raster. Specifically, an electronic scanning beam passes through the dielectric storage mesh, is modulated by the stored charge, and is collected by a collecting anode as a television signal.

The advantage offered by the recording storage tube scan converter 28 of the embodiment of FIG. 3 is long term dynamic pattern storage allowing low animation rates for slowly varying parameters. However, this embodiment is not suitable for high animation rates (15 to 60 Hz., for example) because of flicker in the dynamic display at these rates.

Figure 4:
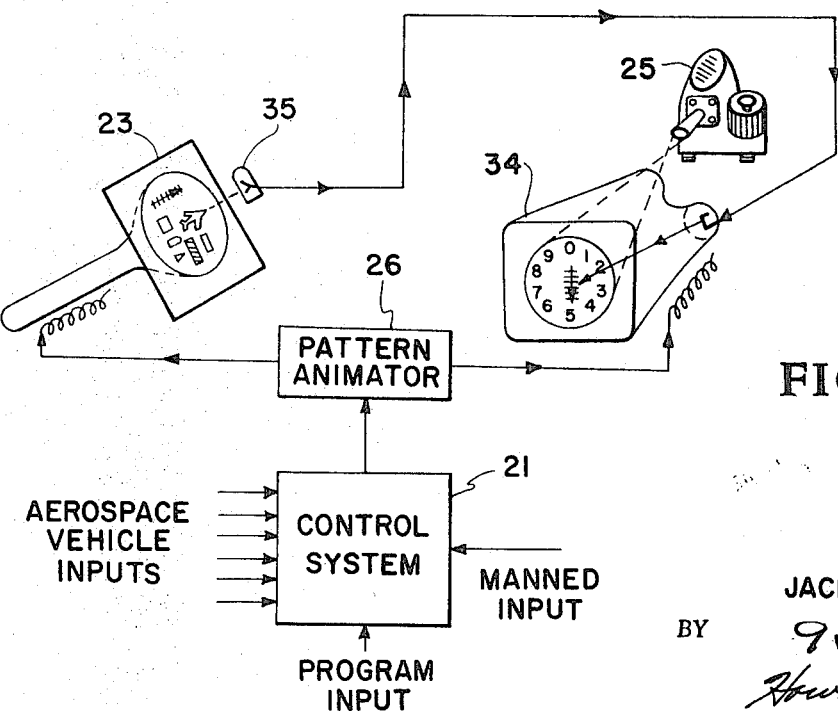
FIG. 4 is a partially block and partially perspective diagram illustrating a third embodiment of the invention.

FIG. 4 illustrates still another alternate embodiment of the invention that comprises all the elements of FIG. 3 with the exception that the scan converter 28, the first vidicon camera 27, the mixer 31, and the composite display 33 are replaced with a single composite display 34. In this composite display 34, the static display is optically displayed onto the face of the composite display cathode ray tube rather than passing through a vidicon tube and video mixer. Hence, the FIG. 4 embodiment is somewhat less complicated, and therefore, less expensive than the FIG. 2 or FIG. 3 embodiments. Advantages offered by the optical-electronic composite display technique are: the capability of color display of static patterns and the elimination of scan conversion equipment. However, the composite display itself is expensive because of the requirement for a wide angle, wide bandwidth deflection system for the display of randomly positioned and animated dynamic element display scans. In addition, the FIG. 4 embodiment does not allow for remote distribution of composite displays on inexpensive television monitors.

Figure 5:
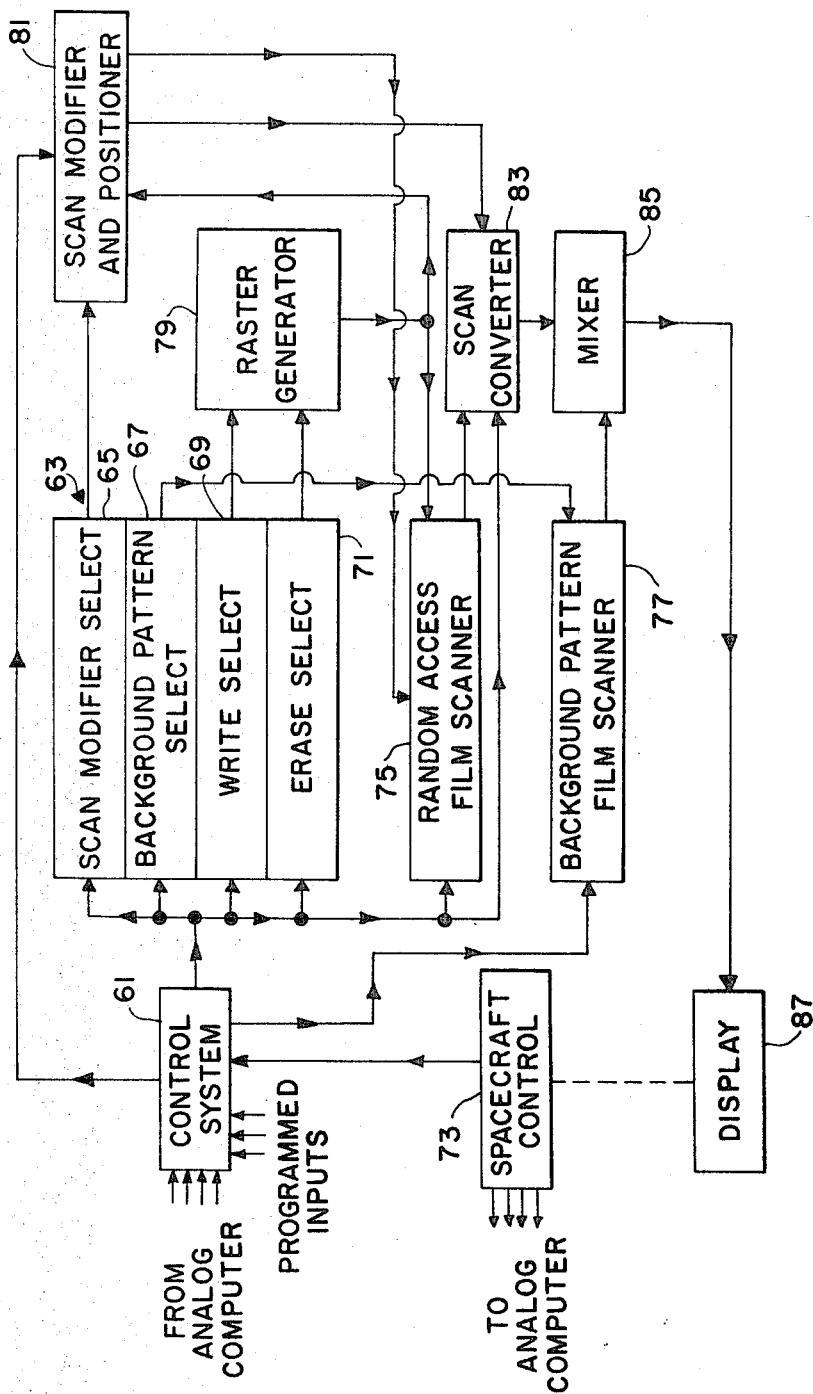
FIG. 5 is a block diagram illustrating the overall system of a general embodiment of the invention.

FIG. 5 illustrates in block form the overall system of the invention and includes a more specific illustration of the control portion of the invention. The embodiment illustrated in FIG. 5 includes: a control system 61; a select system 63 including a select modifier 65, a background pattern select 67, a write select 69, and a erase select 71; a spacecraft control 73; a random access film scanner 75; a background pattern film scanner 77; a raster generator 79; a scan modifier and positioner 81; a scan converter 83; a mixer 85; and a display 87. In addition, the overall system includes an analog or digital computer (not shown).

Signals from the analog or digital computer and programmed inputs are applied to inputs of the control system. The spacecraft control 73 generates signals which are applied to the analog computer so that the analog computer is aware of the condition and the movement of the controls. In addition, some of the spacecraft control signals are applied to the control system 61.

One input from the control system 61 is connected to the scan modifier and positioner 81. A second output from the control system is connected to: inputs of the scan modifier select 65, background pattern select 67, write select 69, erase select 71, of the select system 63; the input of the random access film scanner 75; and the input of the scan converter 83. A third output of the control system 61 is connected to the input of the background pattern film scanner 77.

The output from the scan modifier select 65 is connected to the second input of the scan modifier and positioner 81. The output of the background pattern select 67 is connected to a second input of the background pattern film scanner 77.

The output from the write select is connected to an input of the raster generator 79. The output from the erase select 71 is connected to a second input of the raster generator 79. The output from the raster generator 79 is connected to a second input of the random access film scanner 75 and to a third input of the scan modifier and positioner 81.

The ouput from the random access film scanner is connected to a second input of the scan converter 83. One output from the scan modifier and positioner 81 is connected to a third input of the scanner converter 83. The second output from the scan modifier and positioner 81 is connected to a third input of the random access film scanner 75. The output from the scan converter is connected to one input of the mixer and the output from the background pattern film scanner 77 is connected to a second input of the mixer. The output from the mixer is connected to the display 87.

It will be appreciated that the analog or digital computer contains data from various spacecraft sources as well as from the spacecraft control 73. For example, the analog or digital computer will receive data on environmental conditions around the spacecraft if such conditions are to be displayed. Alternatively, the analog computer will obtain data on spacecraft conditions, such as fuel on board or data battery charge. Still further, the analog or digital computer will receive data on the attitute of the spacecraft. The analog or digital computer applies these signals to the control system. The control system generates control signals in accordance with the spacecraft control input, the programmed input and the analog or digital computer input.

The control signals determine which of a plurality of instrument displays are to be displayed on display 87 and the sequence of those displays. Specifically, the control system through its connections to the select system 63, the random access film scanner 75 and the scan converter 83 controls a dynamic display in the manner described in respect to FIGS. 2, 3, and 4. That is, the scan modifier select 65 determines the modification of the dynamic scan that must be performed for a particular display. This signal is applied to the scan modifier and positioner 81 to perform the appropriate scan modification. In addition, the write select 69 of the select system 63 determines when a scan should be written. This select portion controls the raster generator 79 to create the appropriate writing scan. Similarly, the erase select 71 of the select system 63 determines when the display should be erased. After a write or an erase selection has been made, the raster generator writes or erases in accordance with the selection. It writes by applying sweep and positioning signals to the random access film scanner 75 and sweep and positioning signals to the scan modifier and positioner 81.

At this point, the scan modifier and positioner has a scan modifier select signal and write select signal. It thereafter applies a signal to the scan converter 83 to control the conversion by the scan converter. Simultaneously, the random access film scanner 75 is applying a dynamic display signal to the scan converter 83. Also simultaneously, the control system 61 is applying a control signal to the scan modifier and positioner 81 and to the scan converter 83. Hence, suitable control, dynamic and scan signals are applied to the scan converter 83 and it generates a modified dynamic display.

During the period of time that the dynamic display is being generated, the background pattern film scanner 77 is being controlled by the background pattern select 67 and the control system 61 to generate the background or static display. The static display and the dynamic display are mixed in the mixer 85, which is preferably a video mixer, and applied to the display 87. Preferably, the display 87 is a cathode ray tube or television type of display.

It will be appreciated that the invention is a system for controlling the displaying of instrumentation or other like data on a single display system. That is, a multitude of separate displays can be displayed in a sequential fashion on a single general purpose display instrument such as cathode ray tube. By providing background instrument scales and dynamic instrument readings, integrated composite displays are provided.

It will be appreciated by those skilled in the art and others that the foregoing description has described the general concept of the invention and an apparatus for carrying out the concept. However, numerous modifications may be made in light of the disclosure. In addition, while the invention has been generally described for use on a aerospace vehicle or simulator, it has broader application. Specifically, the invention is useful in any environment where a large quantity of recurring data, such as instrument readings, must be displayed. Hence, the invention may be practiced otherwise than as specifically described herein.

What is claimed is:

1. An electronic animation method of displaying data in an integrated, time-sharing manner comprising the steps of:
   preparing static display patterns and dynamic display patterns;
   storing said static and dynamic display patterns;
   selecting and displaying a specific static pattern;
   selecting, animating, and displaying a specific dynamic pattern conjunctively with the static pattern; and
   controlling said displays in an integrated, time-sharing manner so that a plurality of sequentially occurring conjunctive displays is provided.

2. A method as claimed in claim 1, wherein said static display pattern is an instrument scale display and said dynamic display pattern is an instrument reading display.

3. A method as claimed in claim 1 wherein said static display pattern is a pictorial reference and said dynamic display pattern is a symbolic or pictorial overlay or indicator display.

4. Apparatus for displaying data in an integrated, time-sharing manner comprising:
   static display storage means for storing and displaying static display patterns;
   dynamic display storage means for storing and displaying dynamic display patterns;
   animation means operatively co-acting with said dynamic storage display means for animating said dynamic displays;
   composite display means connected to said static and dynamic storage display means for displaying a composite display; and
   control means connected to said animation means and said static storage display means for selecting static and dynamic displays and for controlling their display means.

5. Apparatus as claimed in claim 4 wherein said static display storage means includes a random access slide projector and a vidicon camera, said camera mounted so as to scan the display surface of said slide projector.

6. Apparatus as claimed in claim 5 wherein said dynamic display storage means includes a random access flying spot film scanner.

7. Apparatus as claimed in claim 6 wherein said animation means includes an electronic signal conversion system for converting dynamic displays.

8. Apparatus as claimed in claim 7 wherein said composite display means includes a cathode ray tube.

9. Apparatus as claimed in claim 8 wherein said control means comprises:
   a control system having control inputs, said control system connected to said random access slide projector and said flying spot film scanner for controlling the selection of patterns from storage in said random access slide projector and said flying spot film scanner.

10. Apparatus as claimed in claim 9 wherein said electronic signal conversion system includes:
    a photomultiplier-amplifier mounted so as to detect light emitting from the surface of said random access flying spot film scanner; and
    a scan converter having a signal input connected to the output of said photomultiplier-amplifier and a control input connected to said animation means and an output connected to said composite display means.

11. Apparatus as claimed in claim 10 wherein said composite display means includes a mixer having one input connected to the output of said scan converter and a second input connected to the output of said vidicon camera and having an output connected to said cathode ray tube.

12. Apparatus as claimed in claim 9 wherein said electronic signal conversion system includes:
    a photomultiplier-amplifier mounted so as to detect light emitting from the surface of said random access flying spot film scanner;
    a dynamic display connected to the output of said photomultiplier-amplifier; and
    a second vidicon camera mounted so as to scan the display surface of said dynamic display and having an output connected to said composite display means.

13. Apparatus as claimed in claim 12 wherein said composite display means includes a mixer having a pair of inputs connected to the outputs of said vidicon cameras and an output connected to said cathode ray tube.

14. Apparatus for displaying instrumentation in an integrated, time-sharing manner comprising:
- a control system adapted to receive inputs from a computer and from a preprogrammed source, said control system also receiving inputs from a control source where said control source also applies signals to said computer;
- a select system connected to an output of said control system;
- a scan modifier and positioner connected to an output of said select system and to an output of said control system;
- a random access film scanner connected to an output of said control system and to an output of said scan modifier and positioner;
- a raster generator connected to an output of said select system and having its outputs connected to said random access film scanner and to said scan modifier and positioner;
- a scan converter having its inputs connected to outputs of said control system, said random access film scanner, and said scan modifier and positioner;
- a background pattern film scanner having its inputs connected to an output of said select system and an output of said control system;
- a mixer having its inputs connected to the outputs of said scan converter and said background pattern film scanner; and
- a display connected to the output of said mixer.

15. Apparatus as claimed in claim 14 wherein said select system comprises:
- a scan modifier select having its output connected to the input of said scan modifier and positioner;
- a background pattern select having its output connected to the input of said background pattern film scanner;
- a write select having its output connected to an input of said raster generator; and
- an erase select having its output connected to an input of said raster generator.

References Cited

UNITED STATES PATENTS

| | | | |
|---|---|---|---|
| 3,191,169 | 6/1965 | Shuman et al. | 343—5 |
| 3,387,084 | 6/1968 | Hine et al. | 340—324 X |
| 3,404,309 | 10/1968 | Massell et al. | 340—324 X |

THOMAS B. HABECKER, Primary Examiner

D. L. TRAFTON, Assistant Examiner

U.S. Cl. X.R.

178—6; 340—27; 343—5